(12) United States Patent
Rehrig

(10) Patent No.: US 6,523,584 B1
(45) Date of Patent: Feb. 25, 2003

(54) PROTECTIVE CABLE COVER FOR WELDING TORCHES

(76) Inventor: Richard B. Rehrig, P.O. Box 1870, San Marcos, CA (US) 92079

( * ) Notice: Subject to any disclaimer, the term of this patent is extended or adjusted under 35 U.S.C. 154(b) by 0 days.

(21) Appl. No.: 09/848,486

(22) Filed: May 3, 2001

(51) Int. Cl.[7] ............................................. B65D 65/02
(52) U.S. Cl. .......................... 150/154; 219/75; 174/135
(58) Field of Search ................................ 150/154, 156, 150/901; 174/36, 135, 136, DIG. 11; 219/75, 136

(56) References Cited

U.S. PATENT DOCUMENTS

| | | | | |
|---|---|---|---|---|
| 2,960,561 A | * | 11/1960 | Plummer | 174/36 |
| 3,038,558 A | * | 6/1962 | Plummer | 150/154 |
| 4,930,543 A | * | 6/1990 | Zuiches | 137/375 |
| 4,939,778 A | * | 7/1990 | Tomberlin | 174/136 |
| 5,357,049 A | * | 10/1994 | Plummer, III | 174/36 |
| 5,571,427 A | * | 11/1996 | Dimock et al. | 219/136 |
| 5,600,098 A | * | 2/1997 | Kazaks | 174/135 |
| D445,093 S | * | 7/2001 | Staskey | D13/156 |

FOREIGN PATENT DOCUMENTS

JP          316213    * 11/2000    ................ 174/36

* cited by examiner

Primary Examiner—Stephen P. Garbe
Assistant Examiner—Lien Ngo
(74) Attorney, Agent, or Firm—Holland & Knight LLP

(57) ABSTRACT

A cable cover for use with welding and cutting apparatus to protect and bundle together the power and any fluid-carrying lines extending from the torch handle. The cover includes an elongated panel formed of a flexible and durable material and having substantially parallel edge portions adapted to be secured together about the torch lines. A zipper is carried by the edge portions for securing those edge portions together over a first major portion of the cover. Strips of hook and loop fasteners are carried by the edge portions of the panel over the last two to three feet of the cover. Thus, a major portion of the cover can be quickly secured about the torch lines using the zipper fastener and one or more torch lines can exit the cover laterally at desired locations through the hook and loop fastener proximate the power supply without adversely impacting the integrity of the cover.

11 Claims, 2 Drawing Sheets

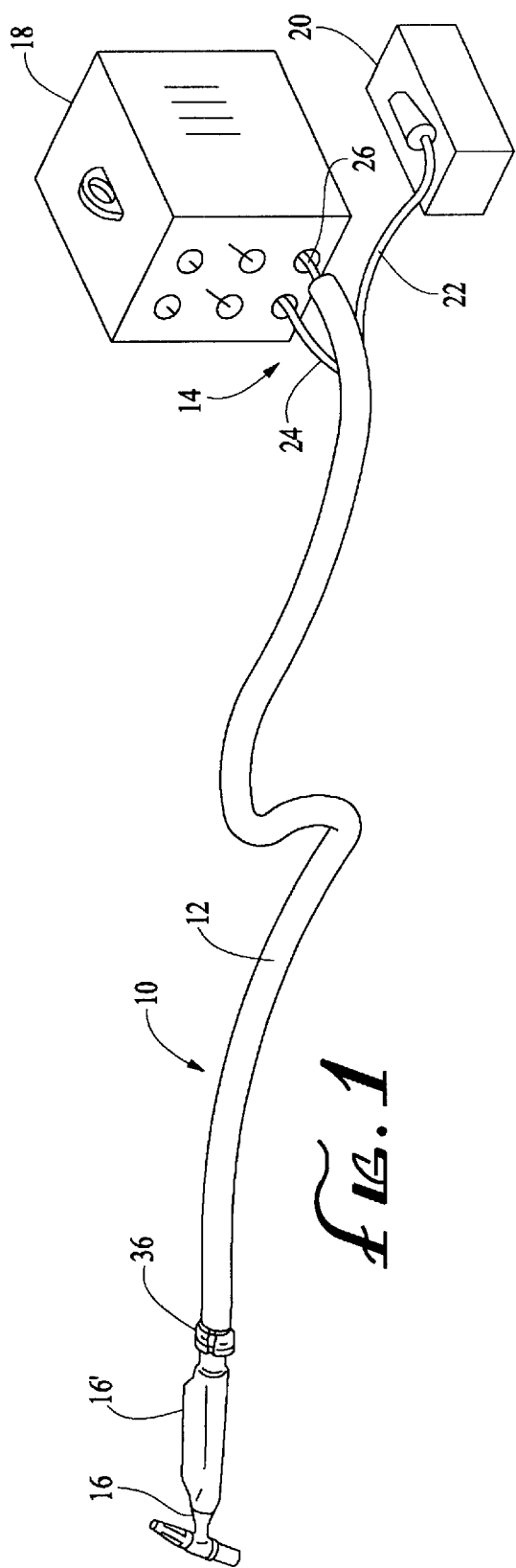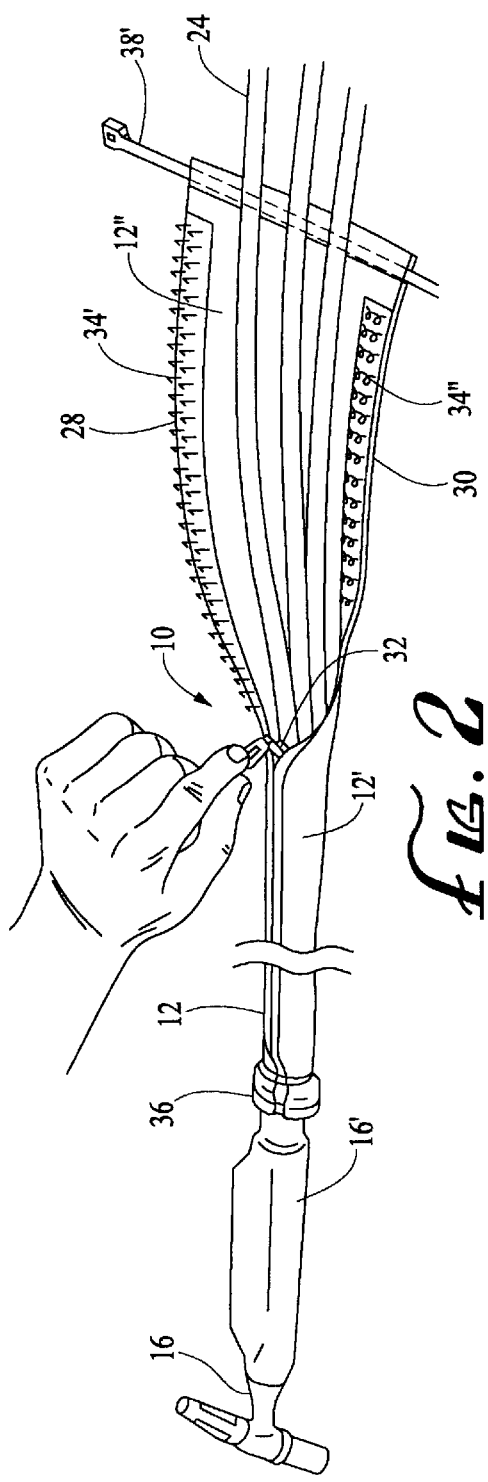

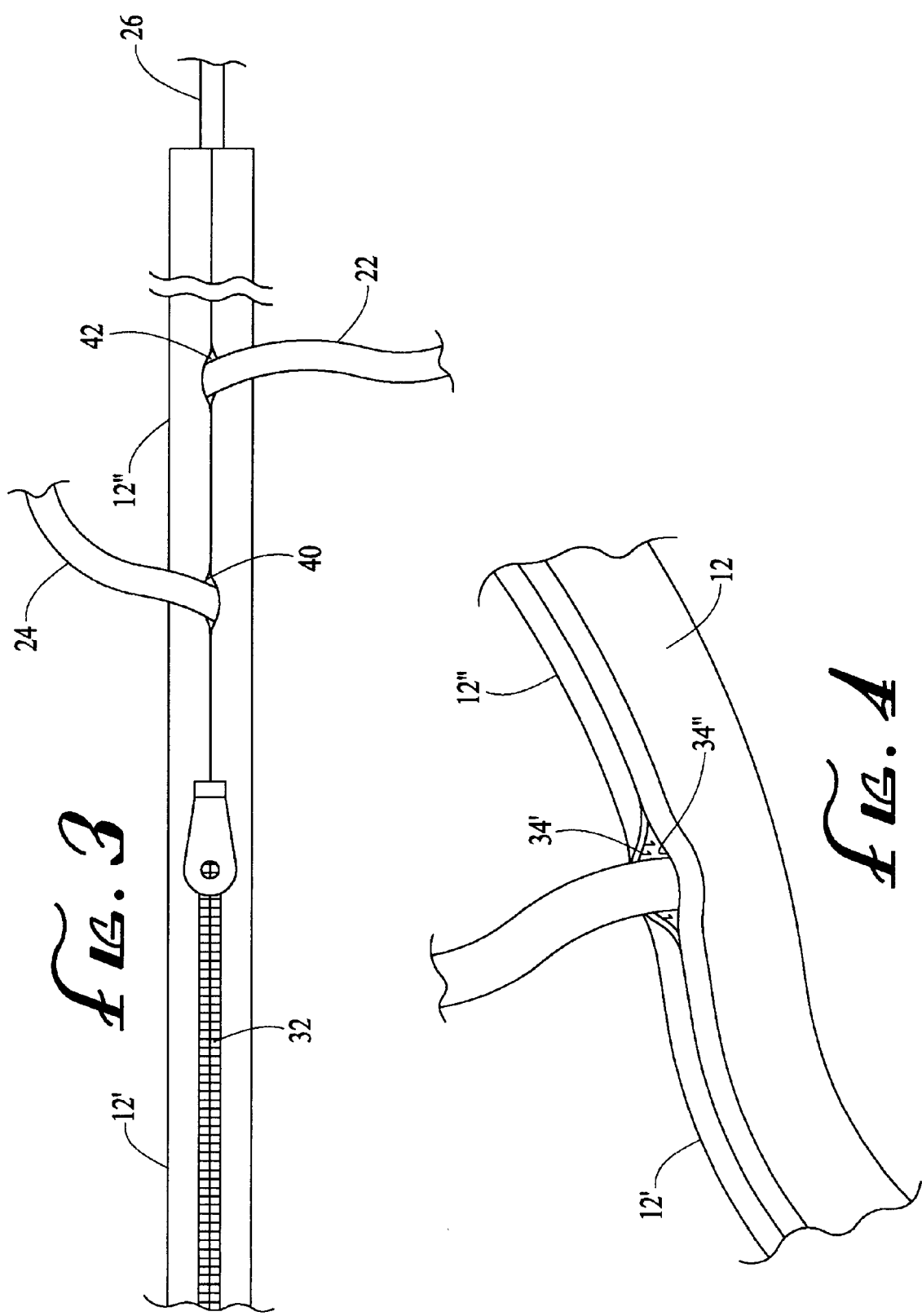

PROTECTIVE CABLE COVER FOR WELDING TORCHES

BACKGROUND OF THE INVENTION

The present invention relates to an improved protective cable cover for use with welding and cutting apparatus such as water cooled TIG (tungsten inert gas) torches, plasma torches and MIG (metal inert gas) guns. Protective cable covers have been used for years to protect and bundle the lines used with these welding and cutting devices. TIG torches, for example, are divided into two groups; air cooled for light duty applications and water cooled for medium to heavy applications. Air cooled torches utilize the radiation from the torch to the surrounding air for cooling and have a single power line extending between the torch head and the power supply or welding machine. That line is reinforced and durable and does not generally require a protective cover. The water cooled TIG torch, however, has three separate service lines connecting the torch head to the welding machine. A first line supplies inert gas to the torch head nozzle. A second line supplies cooling water to the torch head. The third line functions as the water return line and has a conductive cable therein to provide the electric current to the torch head. These lines or hoses are generally constructed of a flexible plastic or rubber tubing and are relatively soft and not particularly durable. As a result, these lines are susceptible to damage from abrasion and sharp objects as they are dragged around the shop floor. They are also susceptible to damage from molten spatter and from being drawn over hot work pieces. As a result, protective covers have been used to protect these lines. The covers also serve to bundle together the individual lines so that they will be less likely to become entangled or caught on other objects. Clips, twist ties or other wrappings are generally avoided as they can choke off or restrict the fluid flow in the lines and create operational and overheating problems.

Protective cable or line covers typically extend the full length of the lines between the torch head and the welding machine or other power supply and are constructed of a wide variety of materials. Durable and flexible material such as nylon or leather are most commonly used. The construction of these protective covers includes slip-on tubing or sheaths and elongated flat strips or webbing that are sewn together along adjacent longitudinal edges or fitted with zippers, snaps, hook and loop fasteners or zip locks along the length of the cover for securing the cover about the line or lines. These cable covers are not only used with water cooled TIG torches, they are also commonly used with plasma torches and MIG guns to protect and bundle the lines. They are occasionally used on air cooled TIG torches for added protection for the power and gas line and in other situations where protection and/or bundling is desired, e.g. where the welder has added an on/off switch to the handle of his or her air cooled TIG torch, which adds another line to the welding assembly and thus creates a need for bundling the lines together.

While these cable covers generally provide excellent protection for the lines, the closures employed on the covers present a variety of problems. Zippered closures extending along the length of the cover are the most popular as they can be easily and quickly installed about the torch lines. One end of the cover is attached to the torch handle and the balance is just zipped closed back to the power supply. Hook and loop fasteners are difficult and time consuming to install particularly along longer lengths. The lines on welding and cutting torches are generally provided in 12.5 foot and 25 foot lengths. Snaps also take longer to secure than zippers and provide unprotected openings in the cover between the snaps that tend to snag on objects around the weld area. While the covers with zippered closures are easy to install and do not present a snagging problem, they do not allow for the separation of the ends of the individual torch lines for connection at their proper locations. Depending on the machine design, it is often desirable to have the supply water line or the gas line project from the cover two to three feet from the power supply panel. As a result, the torch operator using a cover with a zippered closure must leave the last two or three feet of the cable cover unzipped and dangling and exposing the torch lines. To fully protect the lines and avoid a dangling cover, the operator must cut a hole in the cover to allow the lines to exit the cover at the desired locations more proximate the power supply. Cutting the cover, however, leads to fraying and tears and destroys the structural integrity or the cover.

It would be highly desirable to provide a protective cable cover for the torch lines which combines the ease and speed of the zippered closure and the ability of a snap or hook and loop fastener to allow one or more of the bundled lines to exit the cover at any desired location or locations proximate the power supply without presenting a snagging problem or adversely attracting the integrity of the cover. Such a cover would save time in installation, protect the torch lines up to the power supply panel, eliminate the fraying of the cover about any holes cut therein and provide for a tidy and compact installation. The protective cover of the present invention obtains these results.

SUMMARY OF THE INVENTION

Briefly, the present invention comprises a protective cover for use with welding and cutting apparatus that protects and bundles together the lines extending between the torch head and power supply that can be quickly and effortlessly secured in place about the lines and allows the individual lines to exit the cover at any desired location or locations proximate the power supply for connection at separate locations. The cover comprises an elongated panel formed of a durable material and defines parallel lateral edge portions. The panel is adapted to be folded about its center axis over the torch lines such that the panel covers the lines and the lateral edge portions of the panel are in adjacent juxtaposition. A zipper fastener is provided on the edge portions along a first section of the panel and a pair of mating strips of a hook and loop fastener are provided on the edge portions along a second section of the panel. The length of the first section of the panel can vary depending on the length of the torch lines but is substantially greater than the length of the second section of the panel which is about two to three feet. The combined lengths of the two panel sections are substantially equal to or slightly less than the length of the lines extending between the torch head and power supply. The zipper fastener allows a major section of the cover to be quickly and easily secured about the torch handle and zipper closed back to the last three feet of the cover which is then closed about the lines using the hook and loop fasteners. The use of the hook and loop fastener allows one or more of the bundled lines within the protective cover to exit the cover laterally at any desired location or locations along the second section of the panel proximate the power supply and allows the cover to be sealed on either side of the torch line exit area or areas thereby minimizing the exposure of the individual torch lines and maintaining the integrity of the cover.

It is therefore the principal object of the present invention to provide an improved protective cable cover for use with welding and cutting apparatus.

It is another object of the present invention to provide a protective cable cover for use with welding and cutting apparatus which allows for both quick and easy installation about the torch lines and minimizes the exposure of the individual lines when connected at separate locations on and proximate the power supply.

It is a further object of the present invention to provide a protective cable cover for use with welding and cutting apparatus which allows for one or more lines to exit the cover at any desired location or locations proximate the power supply without adversely affecting the integrity of the cover.

It is a still further object of the present invention to provide a protective cable cover for use with welding and cutting apparatus which facilitates installation, maximizes line protection and is of simple construction and economical to manufacture.

These and other objects and advantages of the present invention will become readily apparent from the following detailed description taken in conjunction with the accompanying drawings.

BRIEF DESCRIPTION OF THE DRAWINGS

FIG. 1 is a perspective view showing the protective cable cover of the present invention secured about the lines in a water cooled TIG welding torch assembly.

FIG. 2 is a perspective illustration of the securement of the protective cable cover of the present invention about the lines in a water cooled TIG welding torch assembly.

FIG. 3 is a partial plan view of the protective cable cover of the present invention secured about the torch lines and illustrating the exiting of the water and gas supply lines at different locations along the cover proximate the power supply.

FIG. 4 is an enlarged partial perspective view showing one of the lines exiting the secured cable cover of the present invention through the hook and loop closure portion of the cover.

DETAILED DESCRIPTION OF THE PREFERRED EMBODIMENT

Referring now in detail to the drawings, the protective cable cover 10 of the present invention comprises an elongated panel 12 which is constructed of a flexible and durable material such as nylon or leather and is adapted to be secured about the line or lines in a welding or cutting apparatus so as to protect the lines and bundle the lines together without restricting any fluid flow therethrough. In the application of cover 10 illustrated in the drawings, the cover is utilized with a water cooled TIG torch assembly 14 comprised of a torch head 16, welding machine (power supply) 18, water tank pump 20, water supply line 22, gas line 24 and water return/power line 26. It is to be understood, however, that cover 10 can be utilized with a wide variety of welding and cutting apparatus to protect and bundle the lines including, but not limited to lines extending from both water and air cooled TIG torches, plasma torches and MIG guns. As used herein, the term "torch" includes not only welding and cutting torches but MIG "guns" and their equivalents.

The panel 12 which forms cover 10 is provided with parallel edge portions 28 and 30 such that upon wrapping the panel about the torch lines, the edge portions 28 and 30 are brought into adjacent juxtaposition. A first portion 12' of panel 12 is provided with a zipper closure 32 along the adjacent edge portions 28 and 30 for securing that portion of the panel about the torch lines. The zipper closure 32 is preferably constructed of a non-conductive material such as nylon to prevent high frequency current from arching through the zipper and grounding the torch. A second portion 12" of panel 12 is provided with strips of a mating hook and loop fastener 34' and 34" along the adjacent edge portions. Such a fastener is marketed by Velcro USA, Inc. under the registered trademark VELCRO. The first and second portions 12' and 12" of panel 12 comprise the entire length of the panel and, in the preferred embodiment of the invention, the second portion 12" is about two to three feet in length. The overall length of the cover 10 defined by panel 12 is preferably either 12.5 feet or 25 feet so as to correspond with the lengths of the lines typically employed in weld and cutting apparatus. The length of panel 12 and/or the lengths of the individual portions 12' and 12" could, of course, be varied for different applications. The torch end of cover 12, which defines the extended end of length 12', is preferably provided with a securement clamp 36 for securing that end of the cover to the torch handle 16'. The power supply end of cable 12, which defines the extended end of length 12', is preferably provided with a locking tie 38 to secure that end of the cover about the torch lines proximate the welding machine or other power supply 18. It is to be understood that a wide variety of different clamps and securement ties could be employed to tighten the ends of cover 10 about the torch handle and/or torch lines.

To secure the protective cable cover of the present invention in place about the torch lines, one need only secure the extended end of the first length 12' of the cover 10 about the torch handle 16' utilizing clamp 36 and, as illustrated in FIG. 2, zip the zipper closure 32 back to the end of the first portion 12' of panel 12 thereby joining the adjacent edges of panel 12 along the length of panel portion 12'. The edge portions 28 and 30 of panel 12 are then joined together along the length of second portion 12" utilizing hook and loop fasteners 34' and 34". While securing together the hook and loop fasteners, one or more of the torch lines can be pulled laterally from the cover proximate the power supply for connection of the lines at different locations. The hook and loop fasteners are then secured about any such laterally projecting lines to maintain the integrity of the cover as seen in FIGS. 3 and 4. In FIG. 3, the gas line 24 is shown exiting the cover at 40 for connection to the welding machine 18 at a separate location from the water return/power line 26 and the water supply line 22 is shown exiting the cover at 42 for connection to the water supply tank and pump 20. The water return/power line 26 projects from the extended end of cover 12. As seen in FIGS. 3 and 4, the hook and loop fasteners 34' and 34" are secured about both locations 40 and 42 adjacent lines 22 and 24 whereby the protection of lines 22, 24 and 26 is maximized, the likelihood of the lines being tangled is minimized and the integrity of the cover is maintained. In addition, by utilizing the mating zipper closures 32 over the majority of the overall length of cover 12, the ease and speed with which the cover can be secured in place about the torch lines is significantly enhanced.

In alternate embodiments of the present invention, different closures could be employed along the two portions of panel 12. For example, a zip-lock type closure could be employed on edge portions 28 and 30 along the first portion 12' of panel 12 to provide a fast and easily secured slidable closure for the majority of cover 10. A plurality of individual snap locks or other fastener assemblies could be employed on edge portions 28 and 30 along the second portion 12" of panel 12 in lieu of a hook and loop fastener. While perhaps lacking the speed and ease of hook and loop fasteners, they would allow for the lateral exiting of the torch lines at any selected location or locations without compromising the integrity of the cover. To the extent, however, that such a fastener presented a snagging problem, as do snap locks, or was substantially more laborious to secure, as is a lacing closure, a hook and loop fastener would be preferred.

In another embodiment of the present invention, the two portions 12' and 12" of panel 12 could be physically separated and individually secured about the torch lines in an adjacent disposition. This would allow the first portion 12', which is subjected to more physical abuse than portion 12" due to its greater length and closer proximity to torch head 16, to be manufactured of a more durable material such as leather and the second portion 12" to be constructed of a lighter and more economical material such as nylon. The use of the different types of closures along the lateral edges of the two panel portions would be the same as in the prior embodiments, i.e., a quick slidable closure along the edges of the first panel portion and a hook and loop or similar closure along the edges of the second panel portion to allow for the lateral exiting of one or more of the torch lines. The two panel portions would preferably be provided with securement means adjacent their extended ends such as a locking tie similar to tie 38' employed in the previously discussed embodiment, a resilient clamp or an elastic band formed into the end of the panel portions. Such a securement means would hold the ends of the two panel sections in place about the bundled torch lines without pinching the lines and impeding the fluid flow therethrough.

Various other changes and modifications may be made in carrying out the present invention without departing from the spirit and scope thereof. Insofar as such changes and modifications are within the purview of the appended claims, they are to be considered as part of the present invention.

What is claimed:

1. A cable cover for use with welding and cutting apparatus to protect and bundle together the power line and at least one of any fluid carrying lines extending from a torch handle, said cover comprising:
   an elongated panel formed of a flexible and durable material and defining a first end, a second end and a pair of substantially parallel lateral edge portions extending between said first and second ends;
   a zipper fastener carried by and extending along said edge portions from said first end for a first distance and terminating at a location between said first second ends of said panel for rapidly joining said edge portions together about the torch lines along said first distance; and
   a pair of mating strips of a hook and loop fastener carried by and extending along said edge portions from said proximate location for a second distance to said second end of said panel for joining said edge portions together about the torch lines along said second distance, whereby upon disposing said panel about said lines extending from the torch handle and joining said edge portions together along said first and second distances, one or more of said lines can exit said cover between said strips of a hook and loop fastener at any location along said second distance without adversely affecting the integrity of said cover.

2. The protective cover of claim 1 wherein said second distance is about two to three feet in length.

3. The cover of claim 2 including a first clamping member for securing the first end of said cover about a torch handle and a second clamp for securing the second end of the cover about a torch line.

4. A cable cover for use with welding and cutting apparatus to protect and bundle together the power line and at least one of any fluid carrying lines extending from a torch handle, said cover comprising:
   an elongated panel formed of a flexible and durable material and defining a first end, a second end and a pair of substantially parallel lateral edge portions extending between said first and second ends;
   a first slidably actuated fastener assembly carried by and extending along said edge portions from said first end for a first distance and terminating at a location disposed between said first and second ends of said panel for rapidly joining said edge portions together about the torch lines along said first distance; and
   a second fastener carried by and extending along said edge portions from said location between said ends of said panel for a second distance to said second end of said panel for joining said edge portions together about the torch lines along said second distance, said second distance being less than said first distance whereby upon disposing said panel about said lines extending from the torch handle and joining said edge portions together along said first and second distances, one or more of said lines can exit said cover through said second fastener at any location along said second distance without adversely affecting the integrity of said cover.

5. The protective cover of claim 4 wherein said second distance is about two to three feet in length.

6. The cover of claim 4 wherein said first fastener is a zipper fastener.

7. The cover of claim 5 including a first clamping member for securing the first end of said cover about a torch handle and a second clamp for securing the second end of the cover about a torch line.

8. A cable cover for use with welding and cutting apparatus to protect and bundle together the power line and at least one of any fluid carrying lines extending from a torch handle, said cover comprising:
   a first elongated panel portion formed of a flexible and durable material and defining first and second ends and a pair of substantially parallel lateral first edge portions extending between said ends;
   a first slidably actuated fastener assembly carried by and extending along said first edge portions and terminating at said second end of said first panel portion for rapidly joining said edge portions together about said torch lines along said first panel portion;
   a second elongated panel portion disposed adjacent said first portion, formed of a flexible and durable material and defining a pair of substantially parallel second edge portions, the length of said second panel portion being less than the length of said first panel portion; and
   a second fastener carried by and extending along said second edge portions for joining said edge portions together about said torch lines along said second panel portion, said second fastener allowing one or more of said lines to exit said second panel portion through said second fastener at any location along said second panel portion without adversely affecting the integrity of the cover.

9. The protective cover of claim 8 wherein said second panel portion is about two to three feet in length.

10. The protective cover of claim 8 wherein said first fastener is a zipper fastener.

11. The protective cover of claim 8 wherein said first fastener is a zipper fastener and said second fastener is a hook and loop fastener.

* * * * *